US008687371B2

(12) United States Patent
Arshad et al.

(10) Patent No.: US 8,687,371 B2
(45) Date of Patent: Apr. 1, 2014

(54) TAMPER RESPONDENT MODULE

(71) Applicant: Dy 4 Systems Inc., Kanata (CA)

(72) Inventors: Nauman Arshad, Stittsville (CA); Jing Kwok, Ottawa (CA); Ivan Straznicky, Carleton Place (CA); Martin Terence Cassels, Stittsville (CA)

(73) Assignee: DY 4 Systems Inc., Kanata (CA)

( * ) Notice: Subject to any disclaimer, the term of this patent is extended or adjusted under 35 U.S.C. 154(b) by 0 days.

(21) Appl. No.: 13/654,580

(22) Filed: Oct. 18, 2012

(65) Prior Publication Data
US 2013/0058052 A1 Mar. 7, 2013

Related U.S. Application Data

(62) Division of application No. 12/686,492, filed on Jan. 13, 2010, now Pat. No. 8,325,486.

(60) Provisional application No. 61/144,200, filed on Jan. 13, 2009.

(51) Int. Cl.
*H05K 1/14* (2006.01)
(52) U.S. Cl.
USPC ........... 361/737; 361/719; 361/752; 361/760; 439/352; 439/638; 713/186; 235/382; 235/492
(58) Field of Classification Search
USPC .......... 361/737, 719, 752, 760; 439/352, 638; 713/186; 235/382, 492
See application file for complete search history.

(56) References Cited

U.S. PATENT DOCUMENTS

| 4,860,351 | A | | 8/1989 | Weingart |
| 5,539,379 | A | | 7/1996 | MacPherson |
| 5,568,364 | A | * | 10/1996 | Madden ................. 361/752 |
| 5,621,387 | A | | 4/1997 | Phillips et al. |
| 5,858,500 | A | | 1/1999 | MacPherson |
| 5,986,891 | A | * | 11/1999 | Sugimoto ................. 361/737 |
| 6,053,748 | A | * | 4/2000 | Bricaud et al. ............ 439/76.1 |
| 6,091,605 | A | * | 7/2000 | Ramey et al. ............ 361/737 |
| 6,264,506 | B1 | * | 7/2001 | Yasufuku et al. ......... 439/638 |
| 6,333,854 | B1 | * | 12/2001 | Sasaoka et al. ........... 361/737 |
| 6,375,479 | B1 | * | 4/2002 | Johnson et al. ........... 439/131 |
| 6,396,400 | B1 | | 5/2002 | Epstein, III et al. |

(Continued)

OTHER PUBLICATIONS

"Anti-Tamper Physical Security for Electronic Hardware" Electronic & Electrochemical Materials, 2008, downloaded from W.L. Gore & Associates, Inc. website: http://www.gore.com/en_xx/products/electronic/specialty/antitamper.html.

(Continued)

*Primary Examiner* — Xiaoliang Chen
(74) *Attorney, Agent, or Firm* — Pearne & Gordon LLP

(57) ABSTRACT

A tamper respondent module includes a basecard adapted to be inserted into a slot in a rack enclosure comprising at least one guide edge, at least one electrical coupler, a surface and at least one electronic component that contains information in an electronic format. In one example, an outer cover is coupled to the basecard and includes at least five sides. The outer cover is arranged in a covering relationship over the at least one electronic component. In another example, an anti-tamper apparatus is disposed between the outer cover and the surface. In another example, an anti-tamper circuit is electrically coupled to the at least one electronic component. In another example, a thermal frame is thermally coupled to the at least one electronic component.

11 Claims, 7 Drawing Sheets

(56) References Cited

U.S. PATENT DOCUMENTS

| | | |
|---|---|---|
| 6,400,268 B1 | 6/2002 | Lindskog |
| 6,421,246 B1 * | 7/2002 | Schremmer ............... 361/737 |
| 6,512,454 B2 | 1/2003 | Miglioli et al. |
| 6,532,152 B1 * | 3/2003 | White et al. ............... 361/692 |
| 6,592,031 B1 * | 7/2003 | Klatt ............................ 235/382 |
| 6,666,382 B2 * | 12/2003 | Lisimaque et al. ......... 235/492 |
| 6,760,228 B1 * | 7/2004 | Chi et al. .................... 361/737 |
| 6,929,900 B2 | 8/2005 | Farquhar et al. |
| 6,946,960 B2 | 9/2005 | Sisson et al. |
| 6,982,642 B1 | 1/2006 | Cesana et al. |
| 6,998,981 B1 | 2/2006 | Montague |
| 7,014,490 B1 * | 3/2006 | Morikawa et al. ......... 439/352 |
| 7,015,823 B1 | 3/2006 | Gillen et al. |
| 7,035,108 B2 * | 4/2006 | Wakabayashi et al. ..... 361/719 |
| 7,256,692 B2 | 8/2007 | Vatsaas et al. |
| 7,323,986 B2 | 1/2008 | Hunter et al. |
| 7,352,284 B2 | 4/2008 | Krill |
| 7,388,484 B2 | 6/2008 | Hsu |
| 7,440,287 B1 * | 10/2008 | Ni et al. ...................... 361/752 |
| 7,495,554 B2 | 2/2009 | Heffner |
| 7,528,733 B2 | 5/2009 | Guichard et al. |
| 7,567,434 B1 * | 7/2009 | Sivertsen ................. 361/679.32 |
| 7,836,236 B2 * | 11/2010 | Chou et al. ................... 710/301 |
| 2003/0182485 A1 * | 9/2003 | Schmeisser ................. 710/301 |
| 2005/0275538 A1 | 12/2005 | Kulpa |
| 2006/0075509 A1 | 4/2006 | Kishon |
| 2006/0270263 A1 * | 11/2006 | Hirata ......................... 439/326 |
| 2007/0040674 A1 | 2/2007 | Hsu |
| 2007/0080802 A1 | 4/2007 | Cockburn et al. |
| 2007/0177357 A1 * | 8/2007 | Wakabayashi et al. ...... 361/719 |
| 2008/0030963 A1 * | 2/2008 | Middlekauff et al. ....... 361/737 |
| 2008/0212297 A1 * | 9/2008 | Ni et al. ....................... 361/760 |
| 2008/0276099 A1 * | 11/2008 | Nguyen et al. .............. 713/186 |
| 2008/0284610 A1 | 11/2008 | Hunter |
| 2009/0109029 A1 | 4/2009 | Shih |
| 2009/0140857 A1 | 6/2009 | Krill |

OTHER PUBLICATIONS

"Tamper Respondent Surface Enclosure for High Security Applications" Preliminary Data Sheet Rev. Sep. 22, 2007, downloaded from W.L. Gore & Associates, Inc. website: www.gore.com website.

"Secure Encapsulated Module" downloaded from W.L. Gore & Associates, Inc. website: www.gore.com website.

* cited by examiner

TAMPER RESPONDENT MODULE

CROSS-REFERENCE TO RELATED APPLICATIONS

This application is a divisional application of U.S. application Ser. No. 12/686,492, filed Jan. 13, 2010, now U.S. Pat. No. 8,325,486, which claims the benefit of U.S. Provisional Application No. 61/144,200, filed Jan. 13, 2009, the entire disclosures of which are hereby incorporated herein by reference.

FIELD OF THE INVENTION

The present invention relates generally to an electronic module, and more particularly, to an electronic module with anti-tamper features.

BACKGROUND OF THE INVENTION

Electronic modules often store highly sensitive information. For example, communication devices can store cryptographic keys, handhelds can store passwords and records, and embedded systems can hold sensitive algorithms or information in memory. These devices can easily fall into the wrong hands.

It is conceivable that an attack on a device or installation to obtain information may be mounted in several stages, including but not limited to: 1. Removal of covers or covers and any encapsulant; 2. Identification of the location and function of security sensors; 3. Bypassing of sensors to allow access to the next layer of protection; and so on.

Higher levels of FIPS-140 security requires not just certified cryptography but also physical protection which is needed to protect against someone tampering with, or reverse engineering the security or possibly getting access to information that is to be protected.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a tamper respondent module comprises a basecard adapted to be inserted into a slot in a rack enclosure comprising at least one guide edge, at least one electrical coupler, a surface and at least one electronic component that contains information in an electronic format. An outer cover is coupled to the basecard, comprising at least five sides with at least one side being oriented generally parallel to the surface and spaced a distance from the surface. A plurality of the remaining sides is disposed adjacent to the surface of the basecard. The outer cover is arranged in a covering relationship over the at least one electronic component and at least partially over the surface of the basecard.

In accordance with another aspect of the present invention, a tamper respondent module comprises a basecard adapted to be inserted into a slot in a rack enclosure comprising at least one guide edge, at least one electrical coupler, a surface and at least one electronic component that contains information in an electronic format. A cover comprises a plurality of sides and being arranged in a covering relationship at least partially over the surface of the basecard. An anti-tamper apparatus is disposed between the cover and the surface and is adapted to have electromagnetic energy distributed therein. Damage to the anti-tamper apparatus results in a detectable variation of the electromagnetic energy distribution of the anti-tamper apparatus. An anti-tamper circuit is electrically coupled to the at least one electronic component and comprises a power source. The anti-tamper circuit is adapted to alter or destroy the information contained in the at least one electronic component in response to an indication that the anti-tamper apparatus is damaged.

In accordance with another aspect of the present invention, a tamper respondent module comprises a basecard comprising a surface and at least one electronic component that contains information in an electronic format. An anti-tamper cover is arranged in a covering relationship at least partially over the surface of the basecard. A removable outer cover is arranged in a covering relationship over the anti-tamper cover. An anti-tamper apparatus is disposed between the removable outer cover and the surface, and is adapted to have electromagnetic energy distributed therein. Damage to the anti-tamper apparatus results in a detectable variation of the electromagnetic energy distribution of the anti-tamper apparatus. A thermal frame is thermally coupled to the at least one electronic component and is at least partially covered by the anti-tamper cover. The thermal frame is adapted to transfer thermal energy away from the at least one electronic component and towards an environment located outside of the anti-tamper cover.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
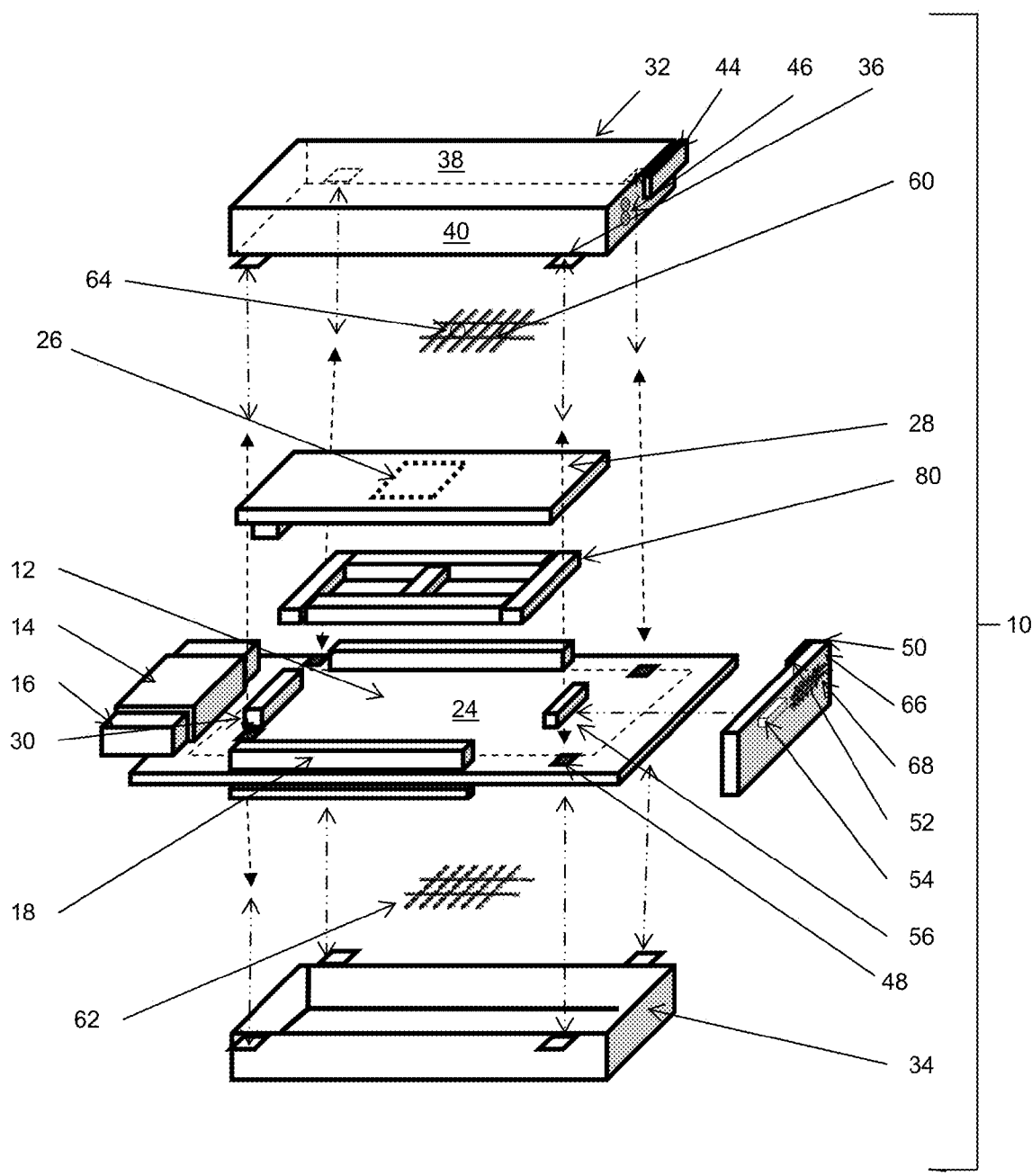
FIG. 1 is an exploded view of one example tamper respondent module.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The module in this application enables a modular physical anti-tamper ("AT") security solution for electronics used in harsh environments for standards based 3U and 6U VPX (VITA-46) formats as well as VITA-48 formats not readily available with past commercial off the shelf (COTS) solutions. This application also enables systems integrators and their end customers to achieve highest levels of FIPS-140-2, CC/EAL and relevant US/UK/EU and Rest of World (RoW) security certifications as applicable.

With increased threats to security breaches and reverse engineering of sensitive defense electronics that may contain sensitive information in the Theatre of Operations (e.g. in the Battlefield), there is a compelling need to protect sensitive electronics with advanced Anti-Tamper Perimeter Defense requirements. Combining this with advanced ruggedization techniques following standards like VITA-46/48 that are needed for electronics in harsh environments, capital expenses (CAPEX) and operational expenses (OPEX) can be considerably reduced while protecting military secrets whose price is invaluable. This is due to the lower cost of acquiring readily available COTS-based Anti-Tamper Perimeter Defense enabled technology in rugged formats and due to easier in-field maintenance and handling of defense electronics as a result of incorporating standards like VPX (VITA-46/48).

This application can be referred to under the names "2LM-ATS" and/or "2LM-ATS Perimeter Defense" which stands for 2-Level Maintenance Anti-Tamper Security. It is to be understood that this 2LM-ATS application can apply to all 3U/6U cards including VPX, VME, CPCI, VXS or future VITA standards, as well as custom bladed systems that leverage AT for commercial or harsh environments. This application can also apply to commercial or rugged air-cooled, conduction cooled or spray-cooled solutions.

Anti-Tamper Perimeter Defense technology is expensive as it is usually customized making it expensive for defense systems integrators to implement in defense platforms within budget (high initial NRE for customizations and high recurring price points makes it an unfeasible mass adoption technology). However, combining AT perimeter defense technology with the close adherence to the VITA-46/48 standards and 3U/6U form-factors will enable lower costs and wider market adoption protecting invaluable embedded defense assets and information which translates into exponential cost savings.

The advantages of modularity will allow for this design to be used across many 3U VPX and 6U VPX boards that have maintained the AT cover keep-outs. The advantages of this re-use and common design will result in lower costs for highly secure 3U and 6U VPX blades. Due to low costs, wider market acceptance of AT and security solutions will result in better protected data, intellectual property, and result in protected secrets that are most valuable in the government or defense applications.

Turning to the shown example of FIG. 1, one example tamper respondent module 10 is illustrated schematically. The tamper respondent module is illustrated as a 3U VPX/6U VPX blade board that is generally adapted to be inserted into a rack enclosure that can house a plurality of similar or different modules. Though the following examples will be described with reference to such a 3U VPX/6U VPX blade board, it is to be understood that the instant application can apply similarly to various other secure electronic modules, such as: financial systems or transactions such as in banking, or in ticketing systems or machines; items concerned with measurement of a commodity, such as in electricity meters for reading, recording or transmitting electricity, gas or water; or in many other items including but not limited to encryption devices, set-top boxes such as television set-top boxes, handheld terminals, secure wireless communication devices, USB tokens, electronic memory devices such as EPROM/PROM or RAM, secure authentication tokens, part of PCMCIA card, or part of a motherboard or single board computer; military applications such as weapon systems, intelligence systems, and/or aerospace control systems; and/or protecting biological material, mineralogical material or hazardous material, etc. Additionally, the tamper respondent module may be used as "smart containers" to protect items, during storage or transport, from unauthorized access and to record and/or provide notification of attempts at such unauthorized access.

The tamper respondent module 10 includes a basecard 12, such as a VPX basecard, with at least one electrical coupler, such as a VPX backplane connector 14. The backplane connector 14 can be rugged, and can include various features such as high speed signaling and/or electro-static discharge (ESD) protection to enable easy handling of line replaceable modules. The backplane connector 14 can provide any or all of power, data communications, cooling, etc. The basecard 12 can also include VPX backplane keying 16 adapted to mate into corresponding structure within a rack enclosure. The basecard 12 can also include anti-tamper keep-outs and can adhere to various military specifications and/or other standards, such as IEEE 1101.2. The basecard 12 can also include at least one guide edge, such as a pair of guide edges, that can include structure, such as a wedgelock 18 or the like, adapted to guide the basecard 12 into a slot 20 in a rack enclosure 22 (see FIG. 5). Either or both side edges can include one or more wedgelocks 18, which can guide and may even secure the basecard 12 within the slot 20 of the rack enclosure. The basecard 12 can further include an optional independent power source 13, such as via a battery, capacitor, etc. such that even if power to the module 10 is interrupted, some or all of the internal circuitry can still operate. Thus, three sides of the basecard 12 can be available to be inserted into a slot 20 in a rack enclosure 22.

As shown, the basecard 12 can include a surface 24, such as a top surface thereof. The basecard includes at least one electronic component 26 that contains information in an electronic format. The information can be analog, digital, or various combinations thereof, and can include various types of information, such as cryptographic keys, passwords, programs, records, sensitive algorithms or other information that it is desired to protect. The electronic component 26 can store the data in analog or digital memory, such as on hard disks, flash memory, RAM, ROM, or any other type of electronic memory as will be known to one of skill in the art.

The electronic component 26 can be electrically coupled to the basecard 12 in various manners, and can be disposed variously within the module 10. In one example, not shown, the electronic component 26 can be disposed on one surface, such as surface 24, of the basecard 12. In addition or alternatively, the electronic component 26 can be disposed on a mezzanine card 28, such as an expansion mezzanine card (e.g., PMC/XMC, custom, etc.) that is electrically coupled to the basecard 12 and fits within the module 10. For example, the basecard 12 can include one or more expansion sites 30

(e.g., PMC/XMC, custom, etc.) that are adapted to electrically couple the mezzanine card to the basecard 12.

One solution to protect the basecard 12 and mezzanine card(s) 28 (3U or 6U) is to utilize an outer cover 32 coupled to the basecard. In one example, the outer cover 32 can be a 2-level (2LM) or 3-level (3LM) maintenance cover (VITA-48) adapted for a standards-based 3U or 6U VPX (VITA-46) blade. In addition or alternatively, a second outer cover 34 can also be used. As shown, the outer cover 32 can be a top cover, while the second outer cover 34 can be a bottom cover, with the basecard 12 located therebetween, although the descriptors "top" and "bottom" are merely arbitrary. The outer cover(s) 32, 34 can be electrically conductive or non-conductive, and can be formed from a generally rigid material, such as metal, alloy, polymer, etc.

The VITA-48 top and bottom covers 32, 34 can be removably or non-removably coupled to the basecard 12, such as by using mechanical fasteners on one or more internal or external flanges 36 or possibly through coupling to the thermal frame (see below), adhesives, welding, etc. In one example, the assembled module 10 fits generally within a VITA-46/48 one inch pitch and should allow support for 2 Level Maintenance. Still, tolerances beyond front of a standard VITA-48 cover may be approximately 5 to 10 mm, or various other values.

As shown in FIG. 1, the outer cover 32 can include a plurality of sides, such as at least five sides with at least one side 38 being oriented generally parallel to the surface 24 and spaced a distance from the surface 24. In one example, the at least one side 38 can be a top side that is arranged generally parallel to the surface 24. The outer cover 32 can further include a plurality of the remaining sides 40 extending from the side 38 and being disposed adjacent to the surface 24 of the basecard 12. For example, some or all of the remaining sides 40 can abut the surface 24, or can be spaced a relatively small distance from the surface 24. In another example, some or all of the remaining sides 40 can indirectly abut the surface 24 through one or more intermediate structures, such as spacers, seals, sensors, etc.

Figure 2:
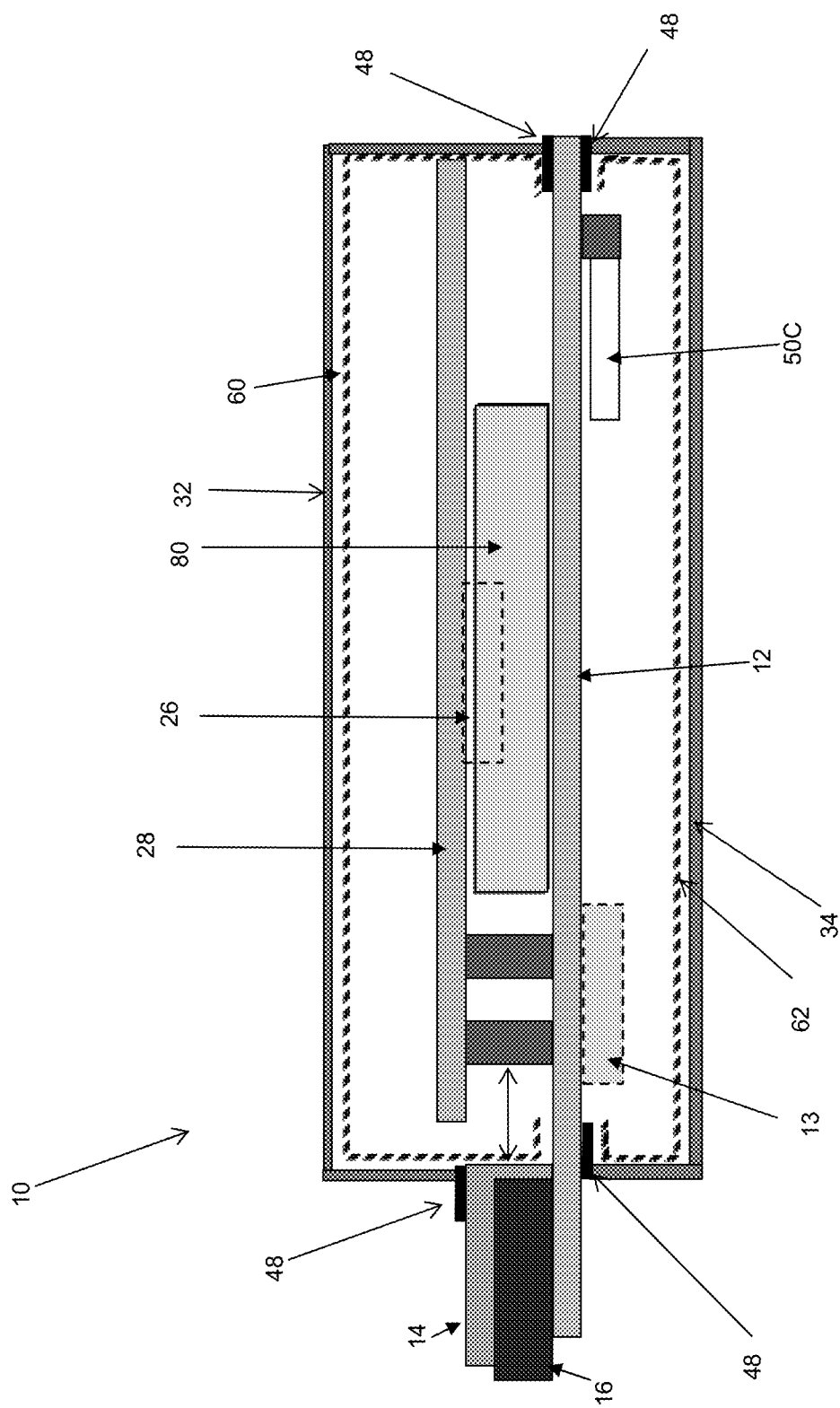
FIG. 2 is a partial sectional view of the tamper respondent module of FIG. 1.
Figure 3:
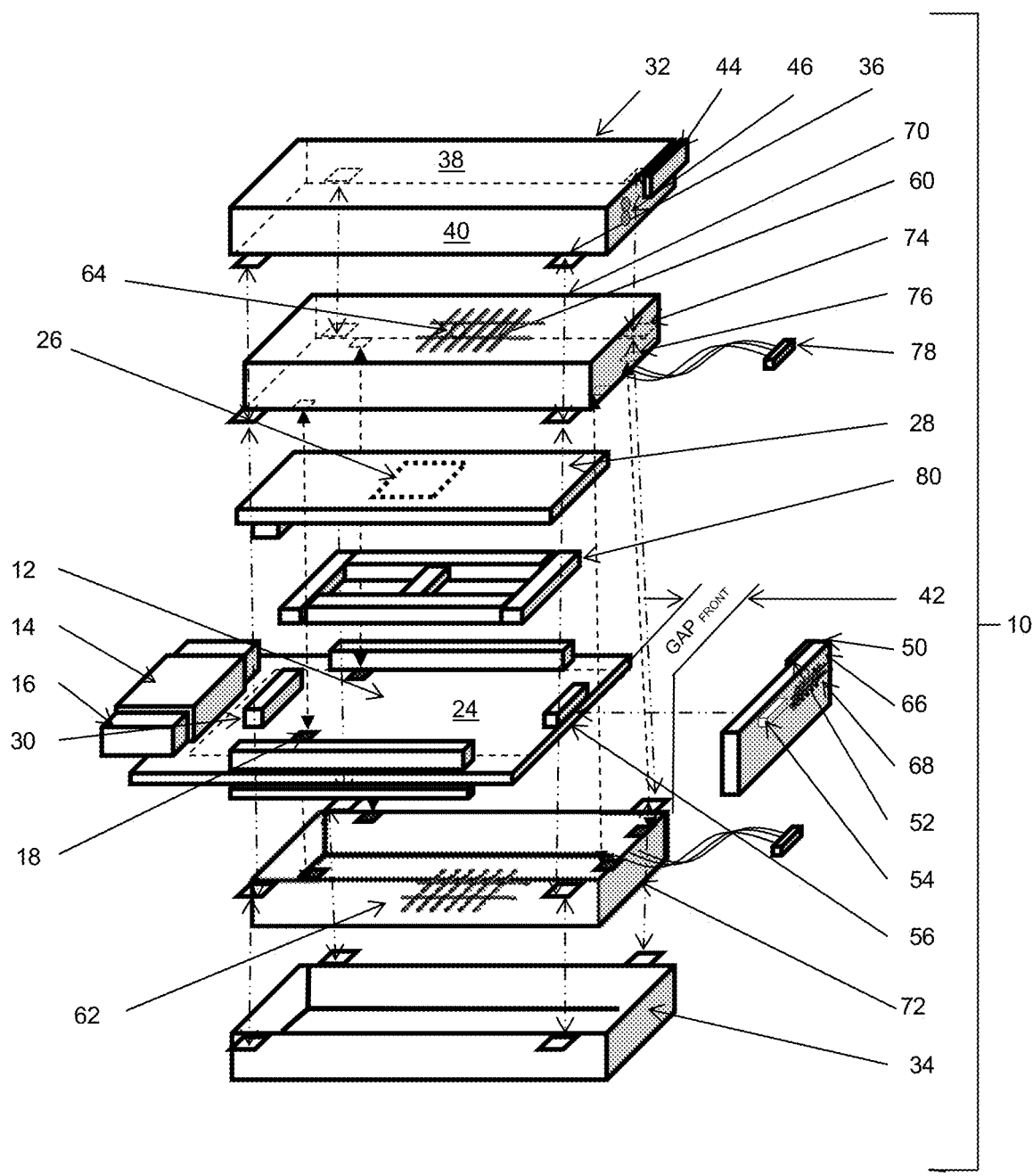
FIG. 3 is an exploded view of another example tamper respondent module.
Figure 4:
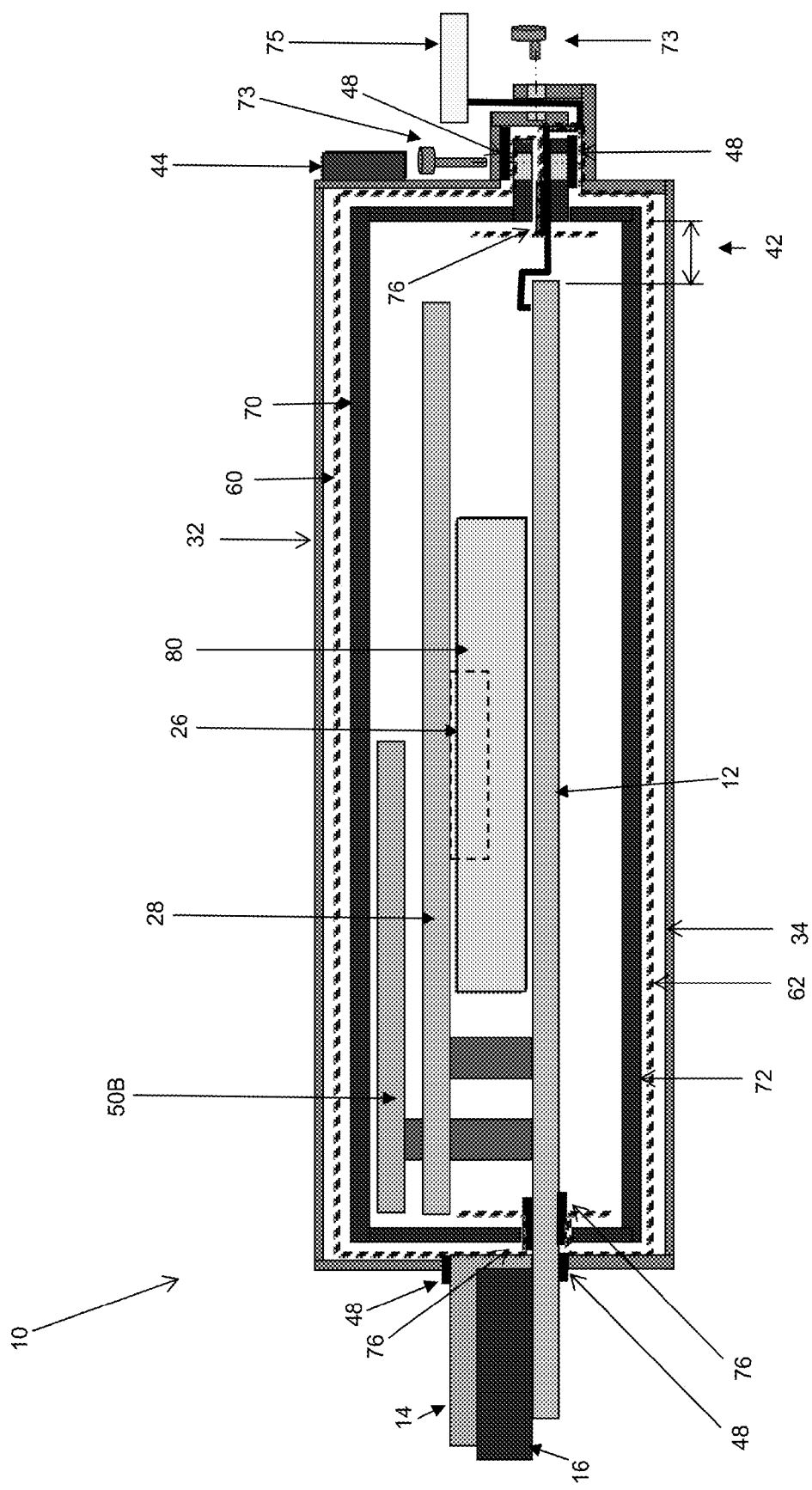
FIG. 4 is a partial sectional view of the tamper respondent module of FIG. 3.

The outer cover 32 is arranged in a covering relationship over the at least one electronic component 26 and at least partially over the surface 24 of the basecard 12. For example, as shown in FIGS. 1-2, the outer cover 32 can be arranged in a covering relationship over the at least one electronic component 26 and substantially completely over the surface 24 of the basecard 12, though some portion of the side edges having the wedgelock 18 and/or backplane connector 14 may still extend beyond the outer cover 32 such that the basecard 12 can be inserted into the rack enclosure 22. In yet another example, as shown in FIGS. 3-4, the outer cover 32 can be arranged in a covering relationship over the at least one electronic component 26 and only partially over the surface 24 of the basecard 12 such that the outer cover 32 extends a distance beyond an edge of the basecard 12 to form a space denoted in FIG. 3 as $GAP_{FRONT}$ 42, as will be discussed more fully herein.

The outer cover 32 can have various features. It is to be understood that the second outer cover 34 can have similar or even different structure, features, etc. and that all discussion of the outer cover 32 can similarly apply. In one example, the outer cover 32 can be opaque such that the at least one electronic component 26, and/or the basecard 12 and/or other components, are not visible through the outer cover 32 when it is coupled to the basecard 12. Thus, where the outer cover 32 has five sides arranged in a covering relationship over the basecard 12, any electronic components (including electronic component 26, mezzanine card 28, etc.), and other elements covered thereby are thus secure from tampering and even from being visible without removal or penetration of the outer cover 32. In another example, the outer cover 32 can be adapted to protect the basecard 12 and any electronic components therein (including electronic component 26, mezzanine card 28, etc.) and other elements covered thereby from electrostatic discharge (ESD). The outer cover 32 can further provide protection against electro-magnetic interference, ultraviolet radiation, infrared radiation, radio waves, x-rays, gamma-rays, etc. For example, where the module 10 is designed for two-level maintenance (2LM), the module 10 can thus be protected from electrostatic discharge while being removed, replaced, handled, repaired, etc. in the field.

In yet another example, the outer cover 32 can include an ejector handle 44 or the like for providing easy ejection (and/or possibly insertion) of the module 10 to/from the slot 20 of the rack enclosure 22. In still a further example, the outer cover 32 can include tamper indicators 46, such as VITA-48 tamper detection status LED's, other audible or visible displays, or the like. The outer cover 32 may simply include holes, recesses, etc. to expose LED's or other tamper indication elements that may be on another circuit board, etc. Still, the outer cover 32 may not include any LED's, holes, recesses, etc. so as to further reduce vulnerability or intrusion points. In still yet a further example, the outer cover 32 can include structure, compositions, coverings, coatings, encapsulant, surface features/finishes, etc. adapted to protect the module 10 and any elements within the outer cover 32 from harsh environments, and provide temperature, structural and/or vibration support.

To provide another layer of security, the module 10 can further include at least one sensor 48 forming an electrical circuit, where the sensor 48 is adapted to detect removal of the outer cover 32 from the surface 24. In one example, the at least one sensor 48 can be a circuit-completion pad (CCP) adapted to form both a physical and electrical connection along some or all sides with the basecard 12, such as via electrical communication with a corresponding CCP or the like disposed on the basecard 12. As shown, the outer cover 32 can include a plurality of sensors 48, such as four sensors 48 with one on each flange 36 (see FIG. 2). In another example, the sensor 48 can be generally continuous. The sensors 48 can indicate, directly or indirectly, an attempt to remove the outer cover 32, such as via the tamper indicators 46, alternation or damage to the sensors 48, via internal circuitry, etc. Various alternative sensors can include an inter-mating connector, a switch, a proximity sensor, a capacitance sensor, a photosensitive device, and acoustically responsive device, a magnetically responsive device, and/or a radio frequency (RF) transponder.

To provide yet another layer of security, the module 10 can further include an anti-tamper circuit 50 electrically coupled to the at least one electronic component 26 and comprising a power source 52. The power source 52 can be independent from the remainder of the module 10, such as via a battery, capacitor, etc. such that even if power to the module 10 is interrupted, the anti-tamper circuit 50 can still operate. The anti-tamper circuit 50 can be adapted to alter or destroy the information contained in the at least one electronic component 26, or even other information and/or components of the module 10, in response to an indication that the sensors 48 detect an attempt to open, remove, and/or penetrate outer cover 32 and the envelope that it forms over the information storage module of the electronic component 26. If the module 10 is tampered with, various security measures or protocols can be implemented via the anti-tamper circuit 50. For example, anti-tamper circuit 50 can be adapted to alter or destroy the information contained in the electronic component 26, such as by automatically erasing and/or "zero-ing out" some or all of the critical data, rendering the data unusable, an alarm may be activated, and/or the electronic component 26 can even be physically or electrically damaged. The anti-tamper circuit 50 can be provided with factory settable or user-defined penalty enforcement routines.

The anti-tamper circuit 50 can be disposed variously about the module 10, but generally can be located under the outer cover 32 (or second outer cover 34) so as to be protected thereby. In one example, as shown in FIG. 1, the anti-tamper circuit 50 can be a module element that is disposed on a separate card coupled to the basecard 12 via mating connectors 54, 56. In such an example, as more fully shown in FIG. 3, the outer cover 32 can extend a distance beyond an edge of the basecard 12 to form a space denoted as $GAP_{FRONT}$ 42, and the anti-tamper circuit 50 can be located within said space.

An alternative design is to have no extension beyond the front edge if a custom mezzanine or no mezzanine is populated on the basecard 12. If populated, the PMC or XMC site can be shifted away from the VITA-46 RT2 connectors, such as by approximately 2 mm, to allow space for any additional covers on the top. For example, as shown in FIG. 4, the anti-tamper circuit 50B can be on a separate mezzanine card coupled to the basecard 12 in a fashion similar to the other expansion mezzanine card(s) 28. In another example, as shown in FIG. 2, the anti-tamper circuit 50C can be populated on the basecard 12. Multiple anti-tamper circuits, independent or in communication, can also be provided.

In addition or alternatively, and to provide yet another layer of security, the module 10 can further include an anti-tamper apparatus 60 disposed between the outer cover 32 and the surface 24. Similarly, the module 10 can include a second anti-tamper apparatus 62 disposed between the second outer cover 34 and a second surface of the basecard 12. The anti-tamper apparatus 60 is illustrated schematically in the drawings, and can have various sizes, geometries, orientations, distributions, etc. The anti-tamper apparatus 60 can be adapted to have electromagnetic energy distributed therein, and damage to the anti-tamper apparatus 60 can result in a detectable variation of the electromagnetic energy distribution of the anti-tamper apparatus 60. In one example, the anti-tamper apparatus 60 can be in electrical communication with the anti-tamper circuit 50, such that the anti-tamper circuit 50 can alter or destroy the information contained in the at least one electronic component 26 in response to an indication that the anti-tamper apparatus 60 is damaged. In a further example, where the module 10 includes both a sensor 48 (e.g., CCP sensor) and an anti-tamper apparatus 60, the that the anti-tamper circuit 50 can alter or destroy the information contained in the at least one electronic component 26 in response to an indication that the sensors 48 detect an attempt to open, remove, and/or penetrate outer cover 32 and/or in response to an indication that the anti-tamper apparatus 60 is damaged. The anti-tamper apparatus 60 can work together with, or even independent of, the sensors 48.

The anti-tamper apparatus 60, which can be a unitary element or even formed of a plurality of elements, can generally surround the electronic component 26 (e.g., information storage module) physically and electronically as it is disposed between the outer cover 32 and the surface 24. The anti-tamper apparatus 60 can have various structures, such as a resistive ink mesh, or possibly other security protective covering, such as a resistive wire approach, etc. Other examples can include a relatively thin, printed circuit board having a plurality of electrically-conductive tracks arranged in a manner difficult to penetrate without detection. In one example, as shown in FIGS. 1-2, the anti-tamper apparatus 60 can be an anti-tamper mesh that is coupled to and/or wrapped at least partially about the outer cover(s) 32, 34. For example, the anti-tamper mesh can be coupled to and/or wrapped generally about the exterior surface of the outer cover(s) 32, 34 and may extend a distance within the interior of the covers 32, 34. Alternatively, the anti-tamper mesh can be coupled to and/or wrapped generally about the interior surface of the outer cover(s) 32, 34 and may extend a distance outwards towards the exterior of the covers 32, 34. The anti-tamper mesh can be removably coupled, or preferably non-removably coupled, to the outer cover(s) 32, 34 and/or basecard 12.

In one example, the anti-tamper mesh can uses a matrix of conductive ink tracks to shield the enclosed electronics, sensitive data or encryption keys. For example, a sheet of the anti-tamper mesh can include layers of flexible material including a matrix of semi-conductive lines printed on thin insulating film. The matrix of lines forms a continuous conductor which is broken if attempts are made to penetrate the film. The anti-tamper mesh can have a property known as the gap vulnerability (i.e., $GAP_{ATC-MESH}$ 64) of the active mesh, which generally denotes the width of an element that can be used to penetrate the anti-tamper mesh without detection, such as by not causing detectable damage to the mesh. The anti-tamper mesh can be further obscured from view by overprinting, overlaminating, or otherwise covering the mesh so as to make it opaque to both the visible and invisible spectrums (e.g., x-rays and the like).

For example, the detection circuit of the mesh can be monitored by opening the conductor at one point and measuring the resistance between the two ends of the detection circuit. In other examples, various other attributes can be monitored, such as voltage, current, capacitance, etc. The sheets can be folded and overlapped to create an enclosure of wedge-shaped, cuboid or cube form (or any other desired geometry) to form an enclosure, and/or to wrap about an existing enclosure.

The anti-tamper mesh can require relatively low power, be non-metallic, and be resistant to being analyzed by X-rays. The anti-tamper mesh can detect physical intrusions by sensing attempts to open, remove, and/or penetrate the envelope that it forms over the electronic component 26 (e.g., information storage module). If the enclosure formed by the anti-tamper mesh is tampered with, various security measures or protocols can be implemented, as discussed herein. For example, critical data can be automatically erased and/or "zeroed out," rendering the data unusable, and/or an alarm may be activated. Thus, the anti-tamper mesh system can provide multi-level protection against physical intrusion such as puncture from drills, probes or the like, chemical attacks, and/or laser penetration.

To provide yet another layer of security, the module 10 can further include an auxiliary anti-tamper apparatus 66 coupled at least partially about the anti-tamper circuit 50. Similar to the described anti-tamper apparatus 60, damage to the auxiliary anti-tamper apparatus 66 can result in a detectable variation to a characteristic of the auxiliary anti-tamper apparatus 66. The anti-tamper circuit 50 can be further adapted to alter or destroy the information contained in the at least one electronic component 26 in response to an indication that the auxiliary anti-tamper apparatus 66 is damaged. Such an approach can be beneficial to inhibit attempts to circumvent the anti-tamper circuit 50. The auxiliary anti-tamper apparatus 66 can similarly be a mesh (or other style), and can have a property known as the gap vulnerability (i.e., $GAP_{ATM-MESH}$ 68) of the active mesh, which generally denotes the width of an element that can be used to penetrate the auxiliary antitamper mesh without detection.

As described herein, one solution to protect the basecard 12 and/or mezzanine card 28 (3U or 6U) is by located or attaching the protective anti-tamper mesh underneath the 2-level maintenance covers 32, 34 (VITA-48) on a standards-based 3U or 6U VPX (VITA-46) blade module 10. However, there can be problems with this approach. For example, the current VITA-48 covers can leave the sides vulnerable and by putting the mesh on the inside only could allow one to drill from the top and peel the mesh off. Furthermore, the anti-tamper mesh material by itself can be vulnerable to harsh environments and should be protected.

Turning to FIGS. 3-4, one solution is to provide the module 10 with additional, separate anti-tamper (AT) cover(s) 70, 72 (i.e., "top AT cover" 70 and "bottom AT cover" 72) that fit underneath the VITA-48 outer covers 32, 34. The top and bottom AT covers 70, 72 could allow locating, coupling, and/or wrapping the anti-tamper apparatus 60, 62 (i.e., anti-tamper mesh) on the outside of these covers 70, 72 along with the idea of extending the sides 40 of the VITA-48 covers to provide physical protection on all five sides of the AT covers 70, 72 and to form as a fastening mechanism to keep the AT covers 70, 72 in place. Thus, in one example configuration the outermost layer includes the VITA-48 outer covers 32, 34, and the innermost layer includes the top and bottom AT covers 70, 72, with the anti-tamper apparatus 60, 62 located therebetween.

From a business side, one conventional problem of including anti-tamper technology in COTS electronics was that each design had to be custom, making the end product very expensive. The idea here is to keep the AT covers 70, 72 generally within the VITA-46/48 standards and make them re-useable (or re-useable with slight modifications) across VPX 3U and 6U cards. This modularity should drive lower recurring costs and/or wider acceptance of this technology.

This application leverages the anti-tamper apparatus technology, and concept of multi-level (AT and VITA-48) top and bottom covers 32, 34, 70, 72. While conventional top and bottom keep-out lids are designed for commercial (i.e., non-rugged) environments, the top and bottom covers 32, 34, 70, 72 described herein are modified to meet the needs for harsh environments (i.e., Military/Defense environments). Additionally, the anti-tamper covers 70, 72 are provided for interfacing with the anti-tamper apparatus 60, 62 (i.e., anti-tamper mesh), and a thermal dissipation scheme is employed. Thus, the VITA-48 covers 32, 34, and the AT covers 70, 72 with the anti-tamper apparatus 60, 62, provide a security boundary (aka. Perimeter Defense) around a 3U or 6U VPX (VITA 46.0) conduction cooled card (IEEE 1101.2) to protect secure information.

As shown in FIGS. 3-4, the anti-tamper cover(s) 70, 72 can be arranged in a covering relationship at least partially over the surface 24 of the basecard, and are disposed between the outer cover(s) 32, 34 and the basecard 12. Thus, the anti-tamper cover(s) 70, 72 are generally smaller than the outer cover(s) 32, 34 to a desired degree. The anti-tamper cover(s) 70, 72 can be removably or non-removably coupled to the basecard 12, such as by using mechanical fasteners on one or more internal or external flanges 74 or possibly through coupling to the thermal frame (see below), adhesives, welding, etc. Though the anti-tamper cover(s) 70, 72 are generally smaller than the outer cover(s) 32, 34, the respective flanges 36, 74 can be arranged to at least partially overlap such that the same coupling method can be used to couple the outer cover(s) 32, 34 and the anti-tamper cover(s) 70, 72 to the basecard 12. Alternatively, the flanges 36, 74 can be completely separate to permit removal and/or replacement of the outer cover(s) 32, 34 (i.e., in a predetermined way without triggering a security event) without removal and/or replacement of the anti-tamper cover(s) 70, 72.

The anti-tamper cover(s) 70, 72 can include a plurality of sides, such as at least five sides with at least one side being oriented generally parallel to the surface 24 and spaced a distance from the surface 24, such as a top side. The anti-tamper cover(s) 70, 72 can further include a plurality of the remaining sides being disposed adjacent to the surface 24 of the basecard 12. For example, some or all of the remaining sides can abut the surface 24, or can be spaced a relatively small distance from the surface 24. In another example, some or all of the remaining sides can indirectly abut the surface 24 through one or more intermediate structures, such as spacers, seals, sensors, etc.

Additionally, to provide even another layer of security, the module 10 can further include at least one sensor 76 forming an electrical circuit, such as the previously described CCP or other sensor, adapted to detect removal of the anti-tamper cover(s) 70, 72 from the surface 24. In one example, the at least one sensor 76 can form both a physical and electrical connection along some or all sides with the basecard 12, such as via electrical communication with a corresponding CCP or the like disposed on the basecard 12, or even a physical and electrical connection with the sensor(s) 48 (i.e., CCP's) of the outer cover(s) 32, 34. As shown, the anti-tamper cover(s) 70, 72 can include a plurality of sensors 76, such as four sensors 76 with one on each flange 74 (see FIG. 3). In another example, the sensor 76 can be generally continuous. The sensors 76 can indicate, directly or indirectly, an attempt to remove the anti-tamper cover(s) 70, 72, such as via the tamper indicators 46, alternation or damage to the sensors 76, via internal circuitry, etc.

In the shown example, the anti-tamper cover(s) 70, 72 and can have a plurality (4 to 5 or more) of inset bosses to enable contact between the anti-tamper apparatus 60, 62 and the basecard 12 through the CCP's to form both a physical and electrical connection along some or all sides. Thus, the anti-tamper cover(s) 70, 72 and anti-tamper apparatus can provide secure protection while also allowing at least two or three sides of the basecard 12 to be available to slide into/out of a rack enclosure 22 (i.e., mounting chassis), and at least one side available to electrically interface (i.e., via the backplane connector 14) with the backplane of the rack enclosure 22. The bottom anti-tamper cover 72 (with optional anti-tamper mesh) can sit on the bottom side of the baescard 12 and forms physical and electrical connections with similar inset bosses on the bottom side of the basecard 12. In a further example, as shown in FIG. 4, the front side of the anti-tamper covers 70, 72 (e.g. where the front of the card is) can extend beyond the front of the card and make contact with each other. An outward facing lip or alternative flanges can be provided to allow one to fasten (e.g., mechanical fasteners 73, adhesives, welding, etc.) the anti-tamper covers with the VITA-48 outer covers and can also provide a path for optional LED's 75 or the like via a flying lead or similar structure, which can provide device status information, alarm indication, etc. This front lip can have one or more CCPs (not shown) that enable electrical connectivity between the top and bottom anti-tamper mesh circuits.

In one example, the anti-tamper apparatus 60, 62 can be at least partially disposed between the outer cover(s) 32, 34 and the anti-tamper cover(s) 70, 72, respectively. For example, as shown in FIGS. 3-4, the anti-tamper apparatus 60, 62 can be coupled to, and/or wrapped about (interior an/or exterior), either or both of the outer cover(s) 32, 34 and the anti-tamper cover(s) 70, 72, or can be freely-floating therebetween. In addition or alternatively, the anti-tamper apparatus 60, 62 can be at least partially disposed between the anti-tamper cover(s) 70, 72 and the basecard 12. In yet another example, an anti-tamper apparatus can be disposed between the outer cover(s) 32, 34 and the anti-tamper cover(s) 70, 72, and also between the anti-tamper cover(s) 70, 72 and the basecard 12 to provide even further multiple layers of security.

As an additional feature, any or all of the outer cover(s) 32, 34 and the anti-tamper cover(s) 70, 72 can be further electrically coupled to the basecard 12 or any mezzanine card(s) 28. For example, as shown in FIG. 3, the anti-tamper cover(s) 70, 72 can include a flying lead 78 or the like to be electrically coupled to the basecard 12 or any mezzanine card(s) 28, including the anti-tamper circuit 50. This can be useful as there may be a PMC, XMC, or custom card connected to the basecard 12 PWB that may inhibit the outer cover(s) 32, 34 and/or anti-tamper covers 70, 72 to connect to the basecard PWB. The $GAP_{FRONT}$ 42 can also facilitate using the flying 78 leads to connect to security circuitry, etc.

While the anti-tamper cover(s) 70, 72 can protect the module 10 and any elements within the outer cover(s) 32, 34 (including any anti-tamper apparatus) from harsh environments, and further provide temperature, structural and/or vibration support, the thermal energy (e.g., heat) generated by the basecard 12 (or even transferred to the basecard 12 from an external source) can be difficult to remove. For example, thermal energy generated by the at least one electronic component 26 can become trapped within the multiple layers of covers 32, 34, 70, 72.

The problem of dissipating heat while enabling structural integrity that can withstand extreme environments, while also physically encapsulating and protecting sensitive electronics, security keys, sensitive cryptographic algorithms and other sensitive data in a secure anti-tamper enabled 5 (or 10) sided Perimeter Defense module, is difficult. The problem is made even further difficult by also making the module 10 capable of protecting against ESD and protecting the electronic boundary (mesh) against harsh environments, while adhering to 3U/6U VPX (VITA46/48) bladed standards and while maintaining electronic contact between the anti-tamper enabled covers and the 3U/6U real-estate limited VPX basecards under extreme shock and vibration scenarios found in harsh defense environments.

Thus, the module 10 can further include a thermal frame 80 that is at least partially enclosed by the outer cover(s) 32, 34 and is thermally coupled (directly or indirectly) to the at least one electronic component 26. The thermal frame 80 can be adapted to transfer thermal energy away from the at least one electronic component 26 and towards an environment located outside of the outer cover(s) 32, 34, such as to the rack enclosure 22 or other external environment. The thermal frame 80 can be unitary or even formed of a plurality of connected or separate elements, and can provide cooling as well as structural and vibration support for the basecard 12.

The top anti-tamper cover 70 can sit on the thermal frame 80 or directly on a portion of the basecard 12 that is designed to dissipate heat. The thermal frame 80 or a heat dissipating PCB is used to properly dissipate heat out of the AT and VITA-48 enclosures. As discussed, heat generated by the base card PCB and/or PMC mezzanine card can be restricted (i.e., trapped) from dissipating due to the inclusion of additional layers and/or covers and/or with the use of the anti-tamper apparatus (e.g., mesh wrap) and the anti-tamper cover(s) 70, 72. Thus, the thermal frame 80 and/or a properly design PCB can provide a conductive cooling solution for either or both the base card PCB and/or PMC mezzanine card, as well as for the at least one electronic component 26.

Figure 5:
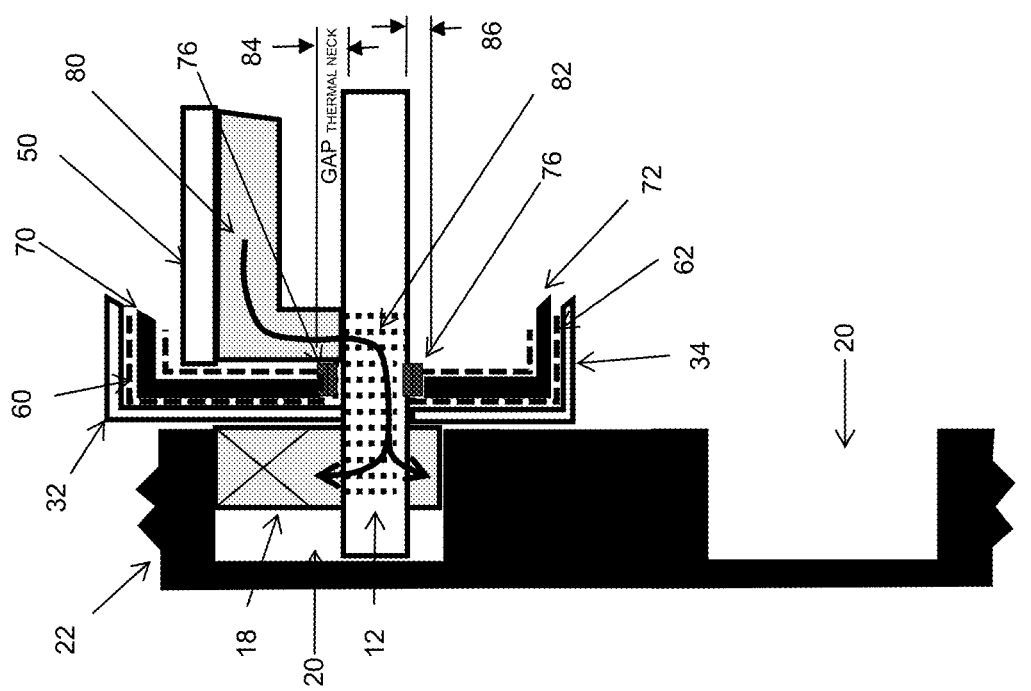
FIG. 5 is a detail view of one example edge of the tamper respondent module of FIG. 3.
Figure 6:
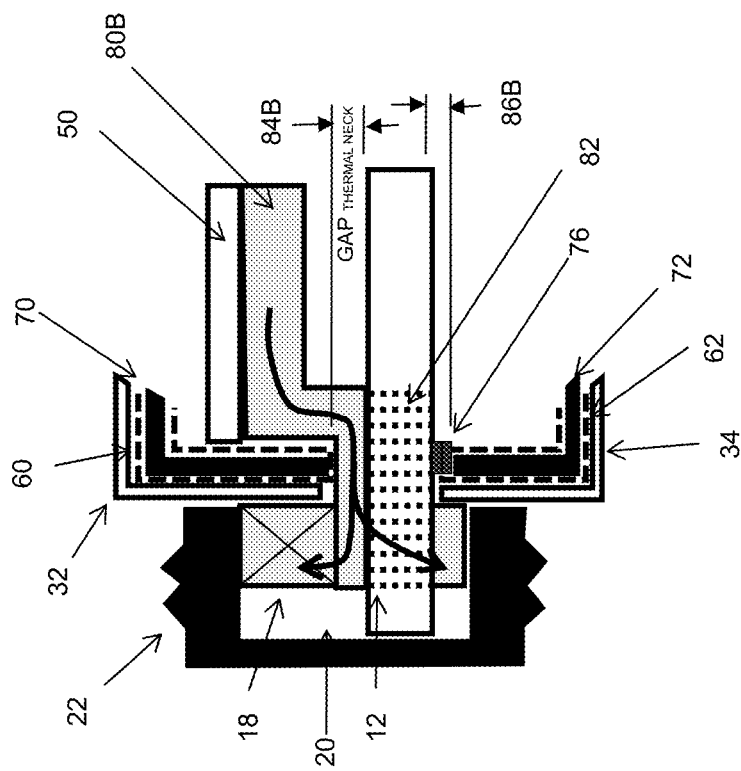
FIG. 6 is similar to FIG. 5, but shows another example edge.
Figure 7:
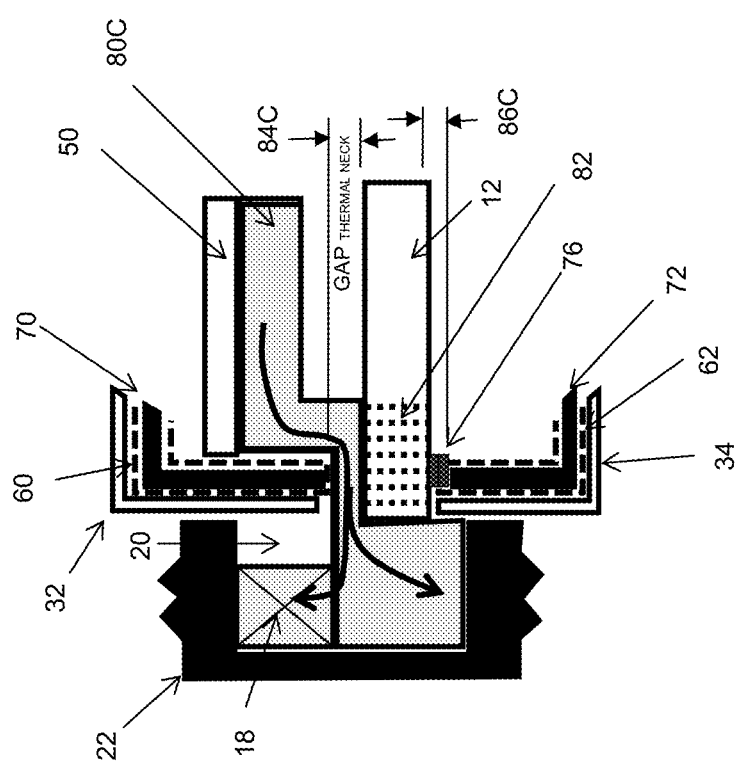
FIG. 7 is similar to FIG. 5, but shows yet another example edge.

Turning to FIGS. 5-7, schematic detail views are illustrated of one example edge of the module 10. The thermal frame 80 can be in direct or indirect thermal contact with the basecard 12 PCB (or components coupled thereto) and/or can extend between the basecard 12 PCB and the optional PMC mezzanine card 28, and can also extend through the VITA-48 covers to the outside environment. It is to be understood that while described as a conduction cooling solution, the thermal frame can be adapted to provide other types of cooling, including convective cooling, active cooling, liquid/gaseous cooling, air-cooling, spray-cooling, etc.

In one example, as shown in FIG. 5, dissipation of heat out of the module 10 can be accomplished by VIA's 82 of the basecard 12. For example, as shown, the thermal frame 80 can be thermally coupled to the basecard 12 about the VIA's 82 such that the thermal energy can flow from out of the module through the VIA's 82 and into the external environment, such as to the wedgelock's 18 and eventually to the slot 20 of the rack enclosure 22.

In another example, as shown in FIG. 6, dissipation of heat out of the module 10 can be accomplished by a modified thermal frame 80B that extends at least partially underneath the outer cover 32 and anti-tamper cover 70. Thus, the thermal frame 80B extends a distance beyond the outer cover 32. The modified thermal frame 80B can be thermally coupled and in direct thermal contact with the external environment, such as to the wedgelock's 18 and eventually to the slot 20 of the rack enclosure 22. Additionally, heat can also be dissipated through VIA's 82 of the basecard 12 (e.g., to the wedgelock's 18 or other structure of the rack enclosure 22).

In yet another example, as shown in FIG. 7, dissipation of heat out of the module 10 can be accomplished by another modified thermal frame 80C that extends at least partially underneath the outer cover 32 and anti-tamper cover 70. Thus, the thermal frame 80B extends a distance beyond the outer cover 32. The modified thermal frame 80C can be thermally coupled and in even greater direct thermal contact with the external environment, such as to the wedgelock's 18 or even directly to the slot 20 of the rack enclosure 22. Additionally, heat can be dissipated through VIA's 82 of the basecard 12 (e.g., to the wedgelock's 18, the modified thermal frame 80C, and/or other structure of the rack enclosure 22). Also as shown, the basecard 12 may be modified to be relatively shorter to increase the size/geometry of the modified thermal frame 80C and facilitate heat flow.

Where the thermal frame 80, 80B, 80C extends at least partially underneath the outer cover 32 and anti-tamper cover 70, care should be taken to avoid creation of a vulnerable intrusion point. Thus, the space or gap created by use of a thermal frame 80, 80B, 80C can be referred to as the $GAP_{THERMAL-NECK}$ 84, 84B, 84C. In one example, the gap or spacing between the top anti-tamper cover 70 and the top surface 24 of the basecard 12 should be less than the gap vulnerability (i.e., $GAP_{ATC-MESH}$ 64) of the active mesh. In other words, the $GAP_{THERMAL-NECK}$ 84, 84B, 84C should be less than or equal to the $GAP_{ATC-MESH}$ 64. Similarly, wherever the anti-tamper apparatus 60 is used, the gap or spacing between the adjacent cover, referred to as the $GAP_{COVER}$ 86, 86B, 86C and the basecard 12 should be less than the minimal vulnerability gap on the mesh. In other words, the $GAP_{COVER}$ 86, 86B, 86C should be less than or equal to the $GAP_{ATC-MESH}$ 64. Finally, where an auxiliary anti-tamper apparatus 66 is used to protect the anti-tamper circuit 50, such as where the anti-tamper circuit 50 is located near an edge of the cover(s), the $GAP_{ATM\text{-}MESH}$ 68 should be less than or equal to the $GAP_{ATC\text{-}MESH}$ 64.

Generally, the instant application can provide various benefits over conventional modules in various manners discussed above, and also in the following manners, including, but not limited to: anti-tamper covers being embedded to facilitate support for rugged environments (i.e., temperature, shock, vibration, electrical/magnetic interference, electrostatic discharge, etc.); outer covers and/or anti-tamper covers fitting within VITA-46 3U and 6U form factors (vs. conventional covers); anti-tamper covers sitting on a thermal frame or on the basecard 12 PWB itself; extended outer covers 32, 34 can be used to protect and provide stiffness for the anti-tamper apparatus 60 for harsh environments; and outer covers 32, 34 can fasten the anti-tamper covers 70, 72 in place with screws and possibly sealant (versus "clamps" directly on the anti-tamper cover that can be used for commercial solutions). Additionally, the thermal frame 80 and/or the basecard 12 PWB can be used to properly dissipate heat utilizing various thermal design methods.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A tamper respondent module, comprising:
   a basecard adapted to be inserted into a slot in a rack enclosure comprising at least one guide edge, at least one electrical coupler, a surface and at least one electronic component that contains information in an electronic format;
   an outer cover coupled to the basecard, comprising at least five sides with at least one side being oriented generally parallel to the surface and spaced a distance from the surface, and a plurality of the remaining sides being disposed adjacent to the surface of the basecard, the outer cover being arranged in a covering relationship over the at least one electronic component and at least partially over the surface of the basecard; and
   further comprising an anti-tamper apparatus disposed between the outer cover and the surface, and adapted to have electromagnetic energy distributed therein, damage to the anti-tamper apparatus resulting in a detectable variation of the electromagnetic energy distribution of the anti-tamper apparatus.

2. The tamper respondent module of claim 1, further comprising an anti-tamper cover arranged in a covering relationship at least partially over the surface of the basecard and being disposed between the outer cover and the basecard.

3. The tamper respondent module of claim 2, wherein the anti-tamper apparatus is at least partially disposed between the outer cover and the anti-tamper cover.

4. The tamper respondent module of claim 2, wherein the anti-tamper apparatus is coupled to at least one of the outer cover and the anti-tamper cover.

5. The tamper respondent module of claim 1, further comprising an anti-tamper circuit electrically coupled to the at least one electronic component and comprising a power source, the anti-tamper circuit being adapted to alter or destroy the information contained in the at least one electronic component in response to an indication that the anti-tamper apparatus is damaged.

6. The tamper respondent module of claim 5, further comprising an auxiliary anti-tamper apparatus coupled at least partially about the anti-tamper circuit, damage to the auxiliary anti-tamper apparatus resulting in a detectable variation to a characteristic of the auxiliary anti-tamper apparatus, and wherein the anti-tamper circuit is further adapted to alter or destroy the information contained in the at least one electronic component in response to an indication that the auxiliary anti-tamper apparatus is damaged.

7. The tamper respondent module of claim 1, wherein the outer cover is opaque such that the at least one electronic component is not visible when the outer cover is coupled to the basecard.

8. The tamper respondent module of claim 1, wherein at least one of the plurality of sides disposed adjacent to the surface of the basecard further comprises a flange adapted to couple said side to the surface.

9. The tamper respondent module of claim 1, further comprising at least one sensor forming an electrical circuit, wherein the sensor is configured to detect removal of the outer cover from the surface.

10. The tamper respondent module of claim 1, further comprising a thermal frame that is at least partially enclosed by the outer cover and thermally coupled to the at least one electronic component, the thermal frame being configured to transfer thermal energy away from the at least one electronic component and towards an environment located outside of the outer cover.

11. The tamper respondent module of claim 10, wherein the thermal frame extends a distance beyond the outer cover and is thermally coupled to external structure located within the environment outside of the outer cover.

\* \* \* \* \*